US009393938B2

(12) United States Patent
Maruyama

(10) Patent No.: US 9,393,938 B2
(45) Date of Patent: Jul. 19, 2016

(54) VEHICULAR BRAKE CONTROL APPARATUS

(75) Inventor: Tasuku Maruyama, Tokyo (JP)

(73) Assignee: FUJI JUKOGYO KABUSHIKI KAISHA, Tokyo (JP)

(*) Notice: Subject to any disclaimer, the term of this patent is extended or adjusted under 35 U.S.C. 154(b) by 1278 days.

(21) Appl. No.: 12/591,347

(22) Filed: Nov. 17, 2009

(65) Prior Publication Data
US 2010/0131168 A1    May 27, 2010

(30) Foreign Application Priority Data

Nov. 21, 2008 (JP) ................... 2008-298433

(51) Int. Cl.
B60T 13/66        (2006.01)
B60T 7/22         (2006.01)

(52) U.S. Cl.
CPC ....................... B60T 7/22 (2013.01)

(58) Field of Classification Search
CPC ..... B60T 7/22; B60T 2201/02; B60T 11/103; B60T 11/105; B60T 13/66; B60T 13/74; B60T 15/014; B60T 15/043
USPC .......... 701/96, 300, 301, 302, 48, 70, 71, 77, 701/78, 79, 82, 83; 180/244, 275
See application file for complete search history.

(56) References Cited

U.S. PATENT DOCUMENTS

| 6,053,584 A | * | 4/2000 | Schunck | B60T 8/00 188/349 |
| 6,336,689 B1 | * | 1/2002 | Eguchi | B60T 7/122 188/DIG. 2 |
| 6,878,096 B1 | * | 4/2005 | Winner | B60T 1/062 477/186 |
| 2003/0033073 A1 | * | 2/2003 | Kichima | B60K 31/0008 701/96 |
| 2005/0159876 A1 | * | 7/2005 | Sugano | B60K 31/0008 701/96 |

FOREIGN PATENT DOCUMENTS

| JP | 2006-306350 | 11/2006 |
| JP | 2007-326399 | 12/2007 |

* cited by examiner

Primary Examiner — Stephen Holwerda
(74) Attorney, Agent, or Firm — McGinn IP Law Group PLLC

(57) ABSTRACT

A brake control apparatus includes a main brake controller configured to control a brake fluid pressure supplied to main brakes provided to a vehicle's four wheels according to a proceeding vehicle's traveling conditions to automatically stop the vehicle using a braking operation of the main brakes and maintain the stop condition and an auxiliary brake controller configured to control parking auxiliary brakes provided to right and left front wheels or right and left rear wheels of the vehicle to perform a braking operation so as to maintain the stop condition of the vehicle. When the auxiliary brakes perform the braking operation while the brake fluid pressure is being supplied to the main brakes to stop the vehicle, the main brake controller rapidly reduces the brake fluid pressure to a predetermined fluid pressure value and then gradually reduces the brake fluid pressure before the main brakes are released.

7 Claims, 4 Drawing Sheets

VEHICULAR BRAKE CONTROL APPARATUS

CROSS-REFERENCE TO RELATED APPLICATIONS

The disclosure of Japanese Patent Application No. 2008-298433 filed on Nov. 21, 2008 including the specification, drawings and abstract is incorporated herein by reference in its entirety.

BACKGROUND OF THE INVENTION

1. Field of the Invention

The present invention relates to a brake control apparatus for a vehicle, capable of releasing a brake operation of main brakes when auxiliary brakes are operated after the main brakes perform the braking operation so as to stop the vehicle while the vehicle is in a follow-up driving state to follow a preceding vehicle.

2. Description of Related Art

A vehicle such as an automobile includes, as a brake apparatus, main brakes mainly operated during traveling and stopping and auxiliary brakes (parking auxiliary brakes) mainly operated during parking. The main brakes are configured to decelerate and stop the traveling vehicle by using brake fluid pressure as a braking force generated corresponding to the operation force applied to the brake pedal by a driver. Further, the auxiliary brakes are configured to maintain a stop condition of the vehicle by a braking operation using a pulling force of wires, which is generated by a parking brake lever provided near a driver's seat or an electric actuator.

In these days, a vehicle having an adaptive cruise control (ACC) system with a preceding-vehicle follow-up function, which is for detecting a preceding vehicle as a follow-up subject of the vehicle and for controlling the vehicle to follow the preceding vehicle. The ACC system includes an automatic brake unit. In a follow-up driving state of the ACC system, when an inter-vehicle distance between the vehicle and the preceding vehicle is less than a predetermined inter-vehicle distance, the automatic brake unit controls the main brakes to perform a braking operation to maintain the inter-vehicle distance to be the predetermined inter-vehicle distance. Further, there is also a known automatic brake unit having an automatic stop function for automatically stopping the vehicle as maintaining a predetermined inter-vehicle distance when the preceding vehicle stops.

Further, regarding the ACC system, there is a known technology for operating parking brakes using an electric parking brake device after the vehicle is stopped and releasing the braking operation of the automatic brake unit in order to save the energy to maintain the braking force while the vehicle is stopped.

For example, JP-A-2007-326399 discloses a technology in which an electric parking brake device operates auxiliary brakes before the vehicle automatically stops. According to the technology disclosed in this document, since the auxiliary brakes are operated before the vehicle is automatically stopped, this helps to set the timing for reducing pressure of the main brakes and releasing the main brakes earlier, and accordingly, the relative operation time and usage frequency of the main brakes can be reduced.

Further, JP-A-2006-306350 discloses a technology for controlling an electric parking brake device to perform a braking operation by auxiliary brakes and then releasing main brakes when it is detected that a driver leaves the vehicle or stops the engine under a stop condition of the vehicle maintained by the main brakes.

According to the technology disclosed in JP-A-2006-306350, since the main brakes are released and the braking condition is maintained by the auxiliary brakes when it is judged that the stop condition of the vehicle will continue for a long period of time, the load applied to the main brakes can be reduced.

SUMMARY OF THE INVENTION

However, according to the technology disclosed in JP-A-2007-326399, the electric parking brake device operates before the vehicle is stopped. Therefore, for example, if the preceding vehicle starts to travel just before the vehicle automatically stops behind the preceding vehicle, since the auxiliary brakes is performing a braking operation even when the main brakes are released, there is a problem that the follow-up responsivity is reduced and preferable acceleration cannot be obtained.

Further, when it is required to use a relatively strong braking force to automatically stop the vehicle, in a typical brake pattern, a so called "temporal releasing" is performed by reducing the braking force for a short time before stopping the vehicle. This "temporal releasing" is performed in order to reduce the degree of lowering of the front of the vehicle (a nose-dive) when the vehicle is stopped and absorb a shock that a passenger receives due to a kickback when the main brakes are released. After that, the braking force is increased again to stop the vehicle. However, according to the technology disclosed in JP-A-2007-326399, since the auxiliary brakes are operated before the vehicle is automatically stopped, there is a disadvantage that the shock applied to the passenger cannot sufficiently be absorbed because of the braking operation of the auxiliary brakes even when the main brakes perform the "temporal releasing" operation.

When a traveling vehicle is stopped by braking, the vehicle body becomes a front lowered posture (a posture in a condition the wheelbase is shortened), with respect to a normal posture (a posture in a condition the vehicle is parked with a released brake on a flat road), due to the inertial force when the vehicle is stopped. Such a front lowered posture is kept until the braking operation of the main brakes is released since four wheels are locked by the main brakes.

As disclosed in the JP-A-2006-306350, if the braking operation of the main brakes is released just after the electric parking brake device operates and the braking force is maintained, since the auxiliary brakes brake only the rear wheels, the release of the lock of the front wheels allow the wheelbase of the stopped vehicle returns to an original condition. This generates a kickback applied to the vehicle body since the front wheels rotate and a shock is applied to the passenger.

Further, according to the technology disclosed in JP-A-2006-306350, if the driver manually operates the auxiliary brakes while the automatic brake unit is operating the main brakes to maintain the stop condition, the main brakes may not be released so that both of the main brakes and auxiliary brakes are kept operating.

In this point of view, the present invention has an object to provide a brake control apparatus for a vehicle capable of reducing a shock that a passenger receives and obtaining a riding comfort since a kickback generated to a vehicle body is small even when a braking operation of main brakes is released after auxiliary brakes are operated.

In order to achieve the object, a brake control apparatus for a vehicle of the present invention includes a main brake controller configured to control a brake fluid pressure supplied to main brakes provided to four wheels of the vehicle according to a traveling condition of a preceding vehicle so as to automatically stop the vehicle using a braking operation of the main brakes and maintain the stop condition; and an auxiliary brake controller configured to control parking auxiliary brakes provided to right and left front wheels or right and left rear wheels of the vehicle to perform a braking operation so as to maintain the stop condition of the vehicle. When the auxiliary brakes perform the braking operation while the brake fluid pressure is being supplied to the main brakes to stop the vehicle, the main brake controller rapidly reduces the brake fluid pressure to a predetermined fluid pressure value and then gradually reduces the brake fluid pressure so that the main brakes are released.

According to the present invention, when a braking operation by the auxiliary brakes is detected while the main brake controller is supplying a brake fluid pressure to the main brakes to stop the vehicle, the brake fluid pressure is rapidly reduced to a predetermined fluid pressure value and then the brake fluid pressure is gradually reduced to release the braking operation of the main brakes. With this configuration, even when the braking of the main brakes are released after the auxiliary brakes are operated, a kickback applied to the vehicle body is small and shock that the passenger receives can be reduced so that a riding comfort can be obtained.

DETAILED DESCRIPTION OF THE PREFERRED EMBODIMENTS

Figure 1:
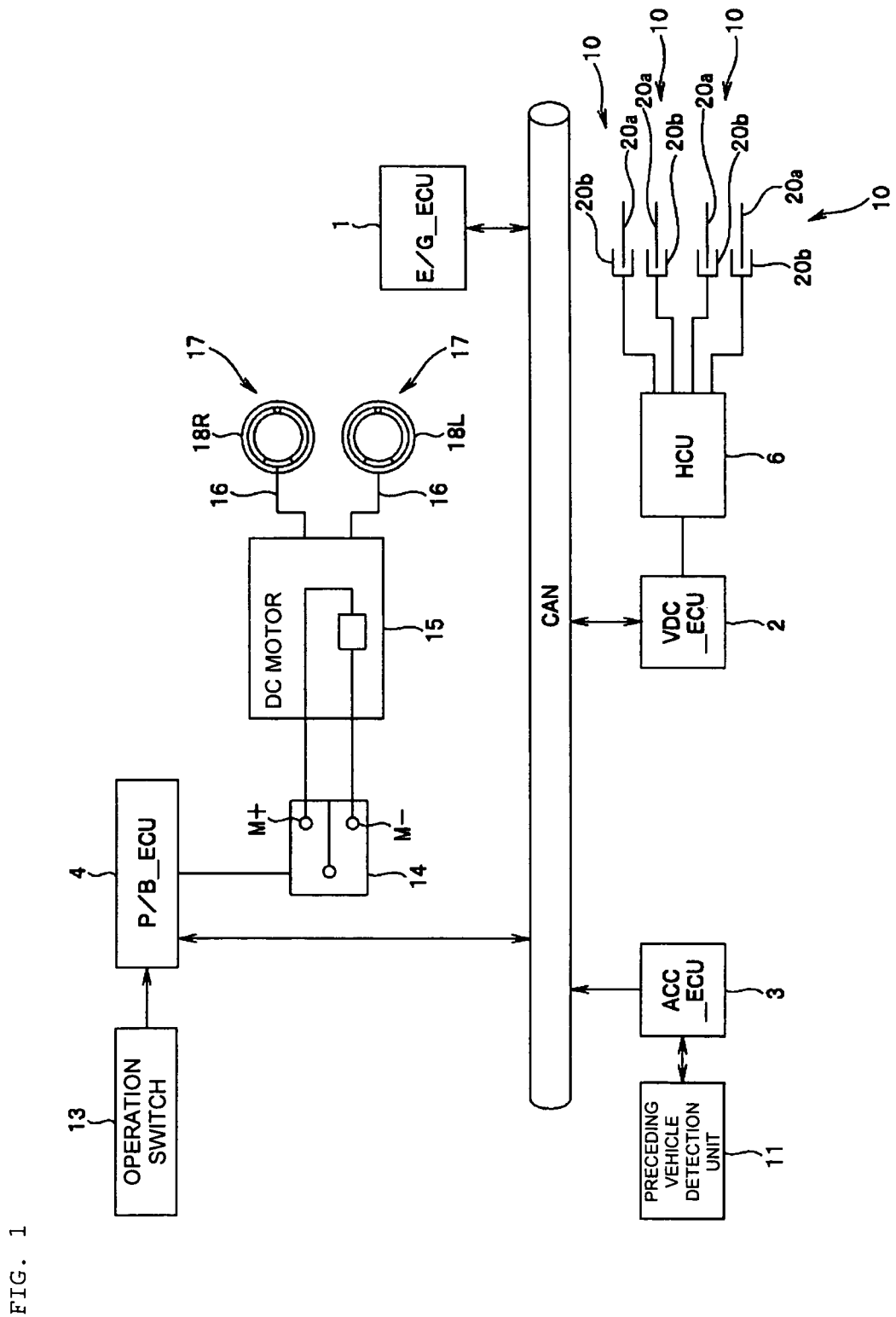
FIG. 1 is a diagram of a system configuration of a vehicle control apparatus.

An embodiment of the present invention will be described with reference to the drawings. FIG. 1 shows a system configuration of a vehicle control apparatus.

A vehicle representing automobiles described in the present embodiment has various electrical control units which control driving conditions of the vehicle. FIG. 1 shows control units, among those various electrical control units, related to a vehicular brake control function described in the present embodiment, which are an engine control unit (E/G_ECU) 1, a vehicle dynamics control (VDC) unit (VDC_ECU) 2 serving as a main brake controller, an adaptive cruise control (ACC) unit (ACC_ECU) 3 and a parking brake control unit (P/B_ECU) 4 serving as an auxiliary brake controller. These ECUs 1 to 4 are mainly composed of microcomputers having a CPU, a ROM, a RAM, an input/output interface and the like, which are not shown, and the ECUs 1 to 4 are connected so as to communicate each other via a CAN (Controller Area Network), which is a typical in-vehicle communication line.

The E/G_ECU 1 controls a throttle opening degree, a fuel injection amount, an ignition timing and the like based on output signals from sensors detecting engine operation conditions such as an engine rotation speed, an accelerator opening degree and an intake air amount. The VDC_ECU 2 executes a VDC control by braking the inner rear wheel when the vehicle is in an understeer condition to generate a yaw moment in a direction to recover the understeer condition and braking the outer front and rear wheels when the vehicle is in an oversteer condition to generate a yaw moment in a direction to recover the oversteer condition, based on wheel speeds of four wheels, a yaw rate applied to the vehicle body and the like. The VDC_ECU 2 also executes an ABS (Anti-lock Brake System) control, when a lock of wheels is detected during a brake operation, to maintain a slip ratio of tires against the road surface to a desired value by reducing brake force applied to the wheels. In an output side of the VDC_ECU 2, a hydraulic control unit (HCU) 6 for controlling a brake fluid pressure is connected.

The HCU 6 has a pump unit for increasing a brake fluid pressure and a valve unit for maintaining or reducing the brake fluid pressure, and controls the fluid pressure applied to main brakes 10 provided to the four wheels according to control signals from the VDC_ECU 2. Here, actual brake fluid pressure applied to the main brakes 10, which is detected by a fluid pressure sensor (not shown), is input to the VDC_ECU 2. The VDC_ECU 2 calculates a difference between the actual brake fluid pressure and target brake fluid pressure and executes a feedback control so as to approximate the actual brake fluid pressure to the target fluid liquid pressure based on the calculated difference.

The main brake 10 is a hydraulic disk brake and has a rotor 20a fixed to the respective wheels, a caliper 20b supporting the rotor 20a in a sandwiching manner, and a wheel cylinder (not shown) operating the caliper 20b. The wheel cylinder is operated by the fluid pressure supplied by the HCU 6.

The ACC_ECU 3 compares an actual vehicle speed with a predetermined target vehicle speed and controls the throttle opening degree so as to approximate the actual vehicle speed to the target vehicle speed. In other words, when a driver selects an ACC driving mode, the ACC_ECU 3 compares the actual vehicle speed with the predetermined target vehicle speed. When the actual vehicle speed is lower than the target vehicle speed, the ACC_ECU 3 outputs an acceleration instruction signal to the E/G_ECU 1 to increase the vehicle speed. When the actual vehicle speed is higher than the target vehicle speed, the ACC_ECU 3 outputs a deceleration instruction signal to the E/G_ECU 1 to reduce the vehicle speed. Further, when a preceding vehicle detection unit 11 detects a preceding vehicle which is a subject that the vehicle follows (hereinafter, simply referred to as a "preceding vehicle"), the ACC_ECU 3 obtains an inter-vehicle distance between the vehicle and the preceding vehicle, a relative velocity, and the like. When the traveling speed of the preceding vehicle is lower than the target vehicle speed, the ACC_ECU 3 executes a follow-up driving control to follow the preceding vehicle. In this case, when the inter-vehicle distance between the vehicle and the preceding vehicle becomes shorter than a target inter-vehicle distance and it is difficult to decelerate to approximate the inter-vehicle distance to the target inter-vehicle distance only by using an engine brake, the ACC_ECU 3 outputs a brake instruction signal to the VDC_ECU 2 so that the HCU 6 generates brake fluid pressure to brake by using the main brakes 10.

Further, while the preceding vehicle is waiting at stoplights, stops because of a traffic jam, or is traveling at low speed, the ACC_ECU 3 outputs a brake instruction signal to the VDC_ECU 2 and executes a low speed follow-up control including an automatic stop control. Here, as the preceding vehicle detection unit 11, a stereo camera, a millimeter wave radar, a laser radar, and the like may be used.

To an input side of the P/B_ECU 4, a brake operation switch 13 is connected. To an output side of the P/B_ECU 4, a motor relay 14 is connected. To the motor relay 14, a brake actuator 15 is connected. Further, to this brake actuator 15, a parking auxiliary brake (hereinafter, simply referred to as an "auxiliary brake") 17 is connected via parking brake wires 16. The auxiliary brakes 17 are mainly configured to be operated when the vehicle is stopped to maintain the stop condition of the vehicle, and respectively disposed at wheel hubs 18L and 18R of right and left rear wheels. When the auxiliary brakes 17 are operated while the vehicle is stopped, the stop condition can be maintained without operating the main brakes 10. According to the present embodiment, as the auxiliary brake 17, a well-known drum-in-disc type brake having a brake drum, brake shoes disposed at inner periphery of the brake drum, and a brake cylinder that operates the brake shoes.

The parking brake wires 16 are two wires separately extending from the brake actuator 15 and connected to the brake cylinders of the respective auxiliary brakes 17. The brake cylinders are configured to enlarge or reduce the diameter of the brake shoes. When the brake actuator 15 pulls the parking brake wires 16, this shifts to a braking condition in which the brake cylinders enlarge the diameter of the brake shoes to generate a braking force. Further, when the brake actuator 15 relaxes the parking brake wires 16, this shifts to a release condition in which the brake cylinders return so as to reduce the diameter of the brake shoes to release the braking force. Note that, in the following description, the direction where the brake actuator 15 pulls the parking brake wires 16 is referred to as a normal direction and the direction that the brake actuator 15 relaxes the parking brake wires 16 is referred to as a reverse direction.

The brake actuator 15 has, for example, a direct-current (DC) motor, a reduction gear train for reducing rotational force of the DC motor, and a lead screw rotated by the reduction gear train, and pulls or relaxes the parking brake wires 16 using the rotation of the lead screw, which rotates with the motor. Here, when the auxiliary brakes 17 are in the braking condition, by providing an irreversible element such as a worm gear to the reduction gear train, the braking forces of the auxiliary brakes 17 can be maintained even when the energization to the brake actuator 15 is stopped. The P/B_ECU 4, the brake actuator 15, and the auxiliary brakes 17 constitute an electric parking brake (EPB) device.

The brake operation switch 13 transmits an input operation to the P/B_ECU 4 and, when the P/B_ECU 4 is operated in manual mode, the P/B_ECU 4 supplies drive power to the brake actuator 15 according to the input to drive the auxiliary brakes 17.

When the driver turns on the brake operation switch 13, the P/B_ECU 4 connects a movable contact of the motor relay 14 to a normal-rotation-side fixed contact M+ to rotate the brake actuator 15 in a normal direction, if the vehicle is stopped. The parking brake wires 16 connected to the brake actuator 15 are pulled accordingly and the auxiliary brakes 17 are driven to lock the wheel hubs 18L and 18R of the right and left rear wheels. Further, when the driver turns off the brake operation switch 13, the movable contact of the motor relay 14 is connected to a reverse-rotation-side fixed contact M− to rotate the brake actuator 15 in a reverse direction. The parking brake wires 16 connected to the brake actuator 15 are relaxed accordingly and to release the lock condition of the wheel hubs 18L and 18R by the auxiliary brakes 17. Here, the motor relay 14 has a function to detect a load applied to the brake actuator 15 and, if the motor relay 14 detects an overload when a braking operation (rotating in a normal direction) or a releasing operation (rotating in a reverse direction) of the brake actuator 15 stops, the movable contact automatically returns to a neutral position and the energization to the brake actuator 15 is automatically blocked.

While the ACC_ECU 3 is executing a low speed follow-up control and after the VDC_ECU 2 controls the main brakes 10 to execute a braking operation to automatically stop the vehicle, the P/B_ECU 4 controls the auxiliary brakes 17 to execute a braking operation to maintain the stop condition of the vehicle. Further, the VDC_ECU 3 executes a brake switch control for releasing the braking forces of the main brakes 10 in synchronization with the braking operation of the auxiliary brakes 17, executed by the P/B_ECU 4.

Figure 2:
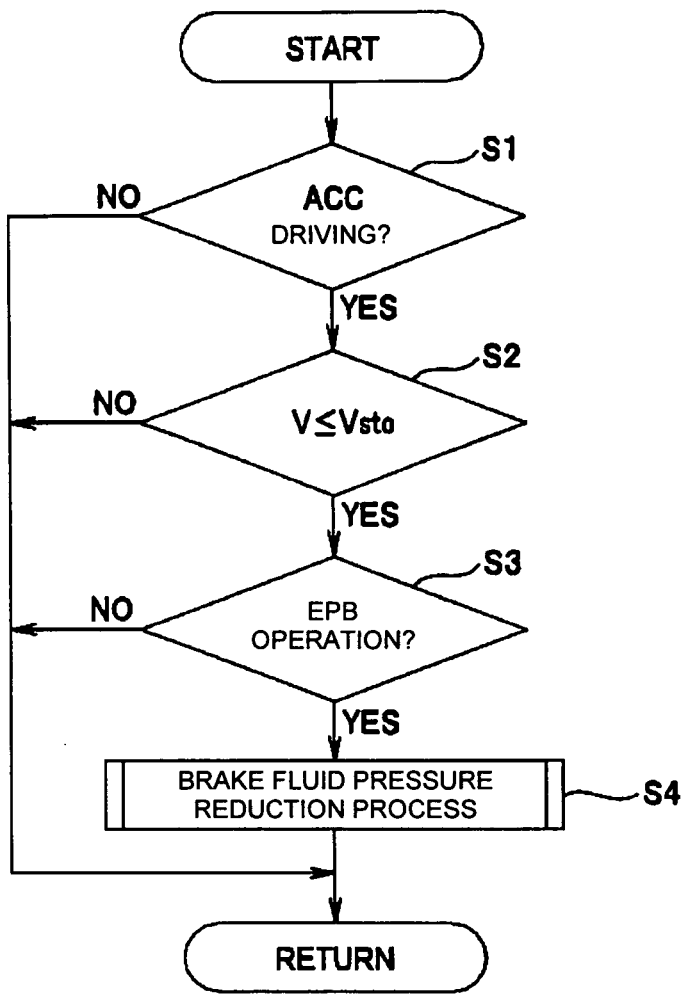
FIG. 2 is a flowchart showing a routine of a brake switch control.

Concretely, the brake switch control by the VDC_ECU 3 is executed as following a brake switch control routine shown in FIG. 2.

This routine is executed at every predetermined calculation period after an ignition switch is turned on. Firstly, in step S1, the VDC_ECU 3 checks whether the vehicle is executing an ACC driving mode. When the vehicle is not executing an ACC driving mode, the VDC_ECU 3 ends the routine. When the vehicle is executing an ACC driving mode, the process proceeds to step S2. In step S2, the VDC_ECU 3 compares a vehicle speed V detected by a vehicle speed sensor (not shown) and a predetermined stop judging vehicle speed Vst. This stop judging vehicle speed Vst is a vehicle speed which can be used to judge that the vehicle has stopped and is ideally 0 [Km/m]. However, according to the present embodiment, the stop judging vehicle speed Vst is set to the minimum vehicle speed which can be detected by the vehicle speed sensor (2 [Km/h], for example). In the following description, in the purpose of simplifying the explanation, the stop judging vehicle speed Vst is assumed to be 0 [Km/h].

When the vehicle speed V of the vehicle is higher than the stop judging vehicle speed Vst (V>Vst), the VDC_ECU 3 ends the routine. On the other hand, when the vehicle speed V of the vehicle is lower than the stop judging vehicle speed Vst, the process proceeds to step S3. Here, in the ACC driving mode, the ACC_ECU 3 executes an automatic stop control, as shown in FIG. 4B for example, until the vehicle speed V becomes lower than the stop judging vehicle speed Vst.

Figure 4:
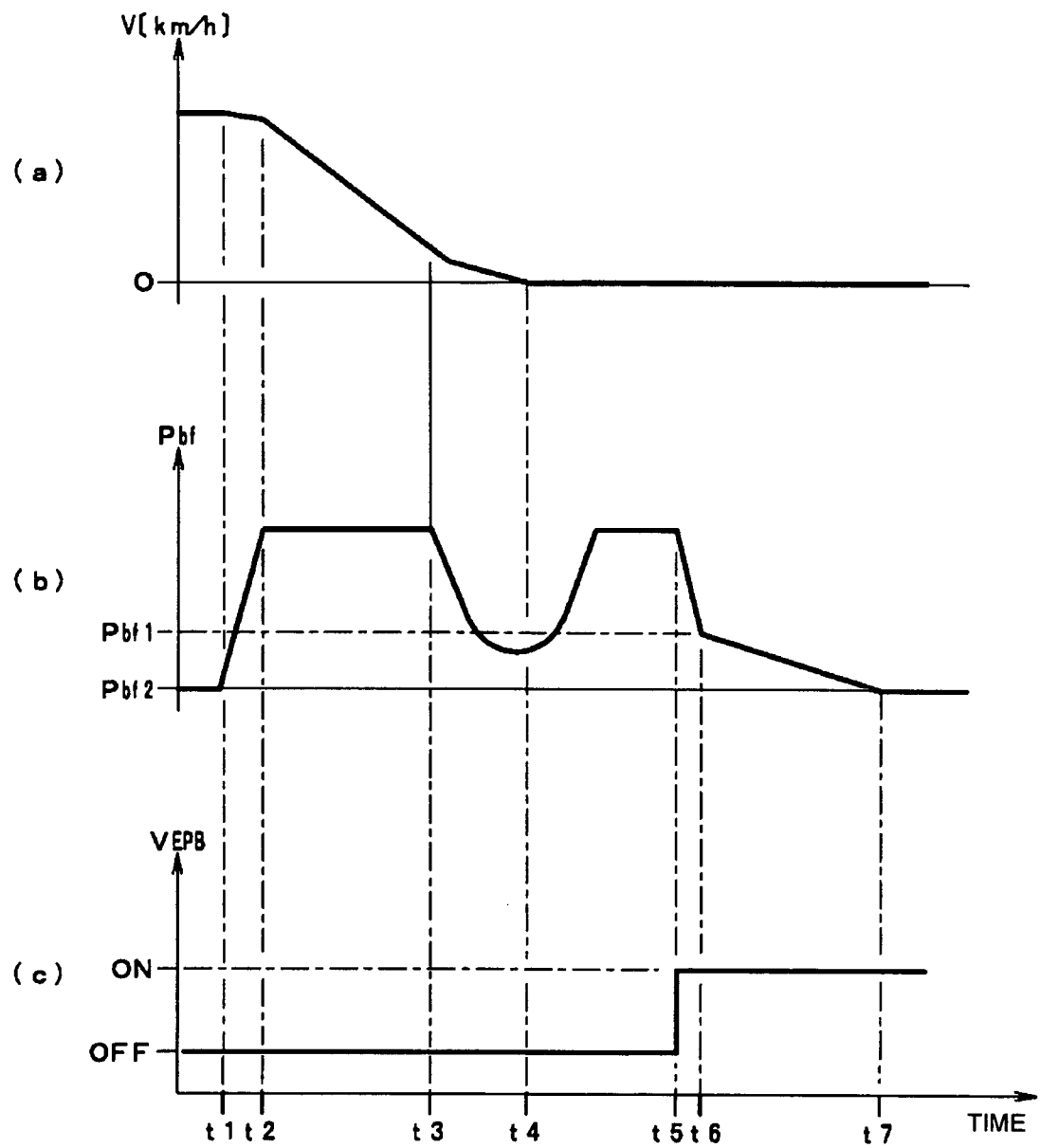
FIGS. 4A to 4C are time charts showing a vehicle speed, a brake fluid pressure and an operation of auxiliary brakes during an automatic stop control.

With reference to FIGS. 4A to 4C, the automatic stop control executed by the ACC_ECU 3 will briefly be described. For example, when a preceding vehicle reduces the speed to wait at stoplights for example, the vehicle which is following the preceding vehicle responds to the decelerating travel of the preceding vehicle. Firstly, the ACC_ECU 3 fully closes a throttle valve, and then, operates the HCU 6 to generate brake fluid pressure so that the main brakes 10 start the braking operation (elapsed time t1). Then, as shown in FIG. 4B, when the target brake fluid pressure Pbf rises and reaches to a predetermined fluid pressure, the pressure is made constant (elapsed time t2). At the same time, the vehicle speed is reduced by the operation of the main brakes 10. When the vehicle speed V reaches to a predetermined low vehicle speed (5 [Km/h], for example) (elapsed time t3), the target brake fluid pressure Pbf is gradually reduced to perform a so-called "temporal releasing." Then, after the vehicle stops (V≈0) (elapsed time t4), the ACC_ECU 3 increases the target brake fluid pressure Pbf again up to a predetermined pressure level and maintains the fluid pressure in order to maintain the stop condition of the vehicle.

After that, the P/B_ECU 4, which is a component of the EPB device, connects the movable contact of the motor relay 14 to the normal-rotation-side fixed contact M+ to rotate the brake actuator 15 in the normal direction to pull the parking brake wires 16 so that the auxiliary brakes 17 execute a braking operation and lock the right and left rear wheels (elapsed time t5).

Here, the processes up to the point that the P/B_ECU 4 controls the auxiliary brakes 17 to execute a braking operation in the braking operation using the target brake fluid pressure Pbf of an automatic stop control are well-known.

On the other hand, the VDC_ECU 3 checks whether the P/B_ECU 4 controls the auxiliary brakes 17 to execute a braking operation (EPB operation) in step S3 of the brake switch control routine shown in FIG. 2. When the EPB operation is not executed, the VDC_ECU 3 ends the routine. Further, when it is determined that the EPB operation is being executed, the process proceeds to step S4 to execute a brake fluid pressure reduction process and then the VDC_ECU 3 ends the routine.

Figure 3:
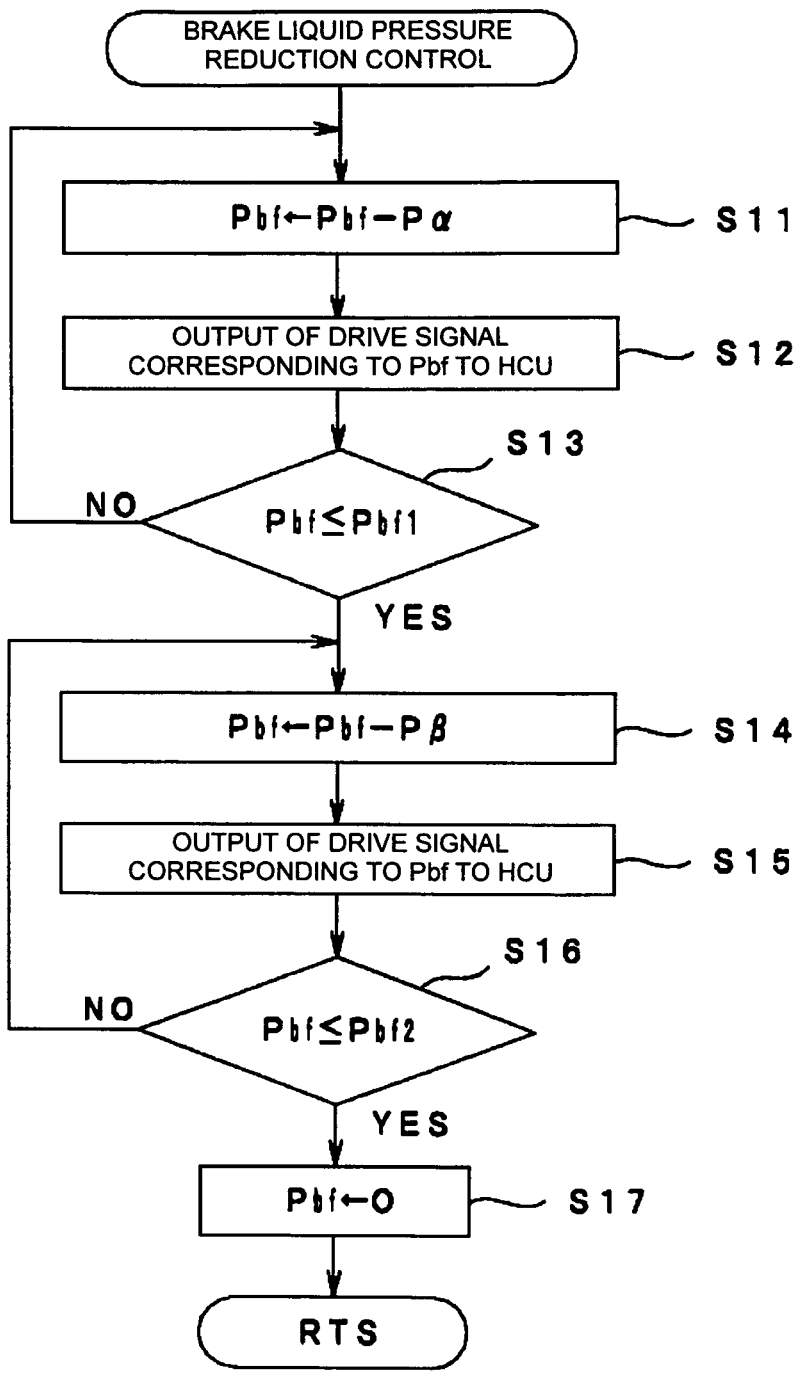
FIG. 3 is a flowchart showing a sub-routine of a brake fluid pressure reduction control.

The brake fluid pressure reduction control is processed as following a sub-routine of the brake fluid pressure reduction control shown in FIG. 3. In this sub-routine, firstly in step S11, the target brake fluid pressure Pbf is updated with a value calculated by subtracting a first pressure reduction value Pα from the target brake fluid pressure Pbf (Pbf←Pbf−Pα). This first pressure reduction value Pα is a value to reduce the target brake fluid pressure Pbf at a relatively sharp gradient (a rapid pressure reduction). For example, the variation is set equal to or slightly smaller than the variation of the target brake fluid pressure Pbf which is made when the driver presses a foot brake to wait at stoplights and then releases the force of pressing the foot brake to drive again.

That is a variation per unit time corresponding to a changing gradient of the target brake fluid pressure Pbf in a case where the driver releases the force of pressing the foot brake of the vehicle while the vehicle is being stopped.

Next, the process proceeds to step S12 and the VDC_ECU 3 outputs a drive signal corresponding to the target brake fluid pressure Pbf set in step S11 to the HCU 6. Then, the HCU 6 operates the valve unit to reduce the target brake fluid pressure Pbf, which is a target value of the brake fluid pressure to be supplied to the main brakes 10, at a relatively sharp gradient (a rapid pressure reduction) (elapsed time t5 to t6).

After that, the process proceeds to step S13 and the ACC_ECU 3 compares the target brake fluid pressure Pbf with a first fluid pressure value Pbf1. This first fluid pressure value Pbf1 is a limit value where the vehicle may not travel because of a creep torque of an automatic transmission and the like when the target brake fluid pressure Pbf is reduced, and in other words, a limit value to maintain the stop condition. In the present embodiment, the first fluid pressure value Pbf1 is set to a value which is slightly higher than the limit value in consideration of an error, an individual difference and the like.

With this configuration, since the four wheels are kept locked even when the target brake fluid pressure Pbf reduces to the first fluid pressure value Pbf1. Thus, even when there is a delay until the auxiliary brakes 17 actually lock (brake) the right and left rear wheels in response to the drive signal from the P/B_ECU 4, the vehicle can be prevented from traveling because of a creep torque of the automatic transmission and the like. Here, the first fluid pressure value Pbf1 may be changed and set based on the changes in the target brake fluid pressure Pbf and the deceleration just before the vehicle stops. In other words, when the deceleration is greater than the variation of the target brake fluid pressure Pbf, it is assumed that the vehicle is traveling on an uphill road. On the other hand, when the deceleration is smaller than the variation of the target brake fluid pressure Pbf, it is assumed that the vehicle is traveling on a downhill road or that there is a large creep torque. In such a case, the traveling of the vehicle can be prevented by increasing and correcting the first fluid pressure value Pbf1.

Then, in step S13, when the target brake fluid pressure Pbf is higher than the first fluid pressure value Pbf1 (Pbf>Pbf1), the process returns to step S11 and the ACC_ECU 3 repeats reducing the target brake fluid pressure Pbf. Further, when the target brake fluid pressure Pbf becomes equal to or lower than the first fluid pressure value Pbf1 (Pbf≦Pbf1), the process proceeds to step S14.

In step S14, the target brake fluid pressure Pbf is updated with a value that is calculated by subtracting the second reduction value Pβ from the target brake fluid pressure Pbf (Pbf←Pbf−Pβ). The second reduction value Pβ is a value to reduce the target brake fluid pressure Pbf at a relatively gradual gradient (a gradual pressure reduction) and set lower than the first pressure reduction value Pα (for example, Pβ≈0.5Pα).

Then, the process proceeds to step S15, and the VDC_ECU 3 outputs a drive signal corresponding to the target brake fluid pressure Pbf set in step S14 to the HCU 6 to operate the valve unit of the HCU 6 to reduce the target value of the brake fluid pressure supplied to the main brakes 10 (target brake fluid pressure Pbf) at a relatively gradual gradient (elapsed time t6 to t7).

After that, the process proceeds to step S16, and the ACC_ECU 3 compares the target brake fluid pressure Pbf with the second fluid pressure value Pbf2. The second fluid pressure value Pbf2 is a value which can be used to determine that the actual brake fluid pressure is zero, and ideally, the second fluid pressure value Pbf2 is equal to zero (Pbf2=0). However, in the present embodiment, the second fluid pressure value Pbf2 is set to be a minimum value that can be detected by the liquid pressure sensor.

Then, when the target brake fluid pressure Pbf is higher than the second fluid pressure value Pbf2 (Pbf>Pbf2), the process proceeds to step S14 and the ACC_ECU 3 repeats reducing the target brake fluid pressure Pbf. Further, when the target brake fluid pressure Pbf is equal to or lower than the second fluid pressure value Pbf2 (Pbf≦Pbf2), the process proceeds to step S17 and the ACC_ECU 3 sets the target brake fluid pressure Pbf to zero and ends the routine.

In this way, in the present embodiment, after the vehicle is stopped by a braking operation of the main brakes 10 in an automatic stop control, the auxiliary brakes 17 are operated to brake the right and left rear wheels. Here, the target brake fluid pressure Pbf which is a target value of the brake fluid pressure supplied to the main brakes 10 is reduced to the first liquid pressure value Pbf1 with a rapid reduction so that the braking period of the main brakes 10 while the vehicle is being stopped is shortened. This reduces the load applied to each part, and the durability of the main brakes 10 and peripheral parts of the main brakes 10 can be improved.

Further, since the first fluid pressure value Pbf1 is set to a value which is slightly higher than the limit value which can maintain the stop condition of the vehicle, a stable stop condition can be maintained as preventing the vehicle from moving if the auxiliary brakes 17 brake the right and left rear wheels before the target brake fluid pressure Pbf is reduced to the first fluid pressure value Pbf1, even when there is a delay in the operation of the auxiliary brakes 17.

Further, after the target brake fluid pressure Pbf is reduced to the first fluid pressure value Pbf1 with a rapid reduction, the target brake fluid pressure Pbf is gradually reduced. Thus, even when the target brake fluid pressure Pbf applied to the main brakes 10 is increased while the vehicle is inclined forwardly (a nose-dive) after the vehicle is stopped, since "temporal releasing" is gradually performed, a kickback to the vehicle body is small so that the shock applied to passengers can be vastly reduced and a riding comfort can be obtained.

In addition, the brake fluid pressure applied by the main brakes 10 after the vehicle is stopped is firstly and rapidly reduced to the first fluid pressure value Pbf1 so that the vehicle will not start to travel, and then gradually, reduced until the brake fluid pressure becomes zero. With this configuration, even when a restarting operation is executed during a brake fluid pressure reduction control for the main brakes 10 is being performed, since the main brakes 10 are not generating strong braking force, the vehicle can be smoothly started soon after the auxiliary brakes 17 are released.

Note that the present invention is not limited to the above described embodiment and may also be applied to a case where the driver turns on the brake operation switch 13 to operate the auxiliary brakes 17, for example. In addition, the auxiliary brakes 17 may be provided to right and left front wheels.

What is claimed is:

1. A brake control apparatus for a vehicle, the brake control apparatus comprising:
    a main brake controller configured to control a brake fluid pressure supplied to main brakes provided to four wheels of the vehicle according to a traveling condition of a preceding vehicle so as to automatically stop the vehicle, as a stop condition, using a braking operation of the main brakes, and to maintain the stop condition; and
    an auxiliary brake controller configured to control parking auxiliary brakes provided to right and left front wheels or right and left rear wheels of the vehicle to perform a braking operation of the parking auxiliary brakes so as to maintain the stop condition of the vehicle,
    wherein, when the auxiliary brakes perform the braking operation of the auxiliary brakes while the brake fluid pressure is being supplied to the main brakes to stop the vehicle, the main brake controller reducing the brake fluid pressure according to a first rate to a predetermined fluid pressure value and then reducing the brake fluid pressure according to a second rate before the main brakes are released, wherein the first rate is greater than the second rate,
    wherein, when a signal from the auxiliary brakes indicates that that the auxiliary brakes perform the braking operation of the auxiliary brakes, the main brake controller then automatically performs a reduction of the brake fluid pressure and then automatically releases the main brakes,
    wherein the main brake controller is configured to control the brake fluid pressure of the main brakes while the auxiliary brakes are working, and
    wherein said reducing the brake fluid pressure according to the first rate of the brake fluid pressure and said reducing the brake fluid pressure according to the second rate of the brake fluid pressure are synchronized with the braking operation of the parking auxiliary brakes.

2. The brake control apparatus according to claim 1, wherein the predetermined fluid pressure value is set to a limit value that is configured to maintain the stop condition of the vehicle or a value slightly higher than the limit value.

3. The brake control apparatus according to claim 1, wherein the brake fluid pressure is reduced to another predetermined fluid pressure value according to the second rate, and
    wherein said another predetermined fluid pressure value is calculated to not maintain the stop condition of the vehicle.

4. The brake control apparatus according to claim 3, wherein said predetermined fluid pressure value is greater than a pressure value calculated to maintain the stop condition of the vehicle.

5. The brake control apparatus according to claim 1, wherein said predetermined fluid pressure value is greater than a pressure value calculated to maintain the stop condition of the vehicle.

6. A brake control apparatus for a vehicle, comprising:
    a main brake unit configured to control a brake fluid pressure supplied to main brakes provided to four wheels of the vehicle according to a traveling condition of a preceding vehicle so as to automatically stop the vehicle, as a stop condition, using a braking operation of the main brakes, and to maintain the stop condition;
    an auxiliary brake unit configured to control parking auxiliary brakes provided to right and left front wheels or right and left rear wheels of the vehicle to perform a braking operation of the parking auxiliary brakes so as to maintain the stop condition of the vehicle;
    an inter-vehicle distance detecting device configured to detect a distance between the vehicle and another vehicle, wherein inter-vehicle distance detecting device is further configured to detect the traveling condition of the preceding vehicle so as to automatically stop the vehicle, as the stop condition, using a braking operation of the main brakes, and to maintain the stop condition; and
    a control unit configured to control the main brakes and the auxiliary brakes in a follow-up driving state based on an input from the inter-vehicle distance detecting device, said control unit comparing a vehicle speed of the vehicle to a predetermined vehicle speed, and if the vehicle speed is less than the predetermined vehicle speed, then the control unit executes a braking operation, said braking operation including, upon reaching the predetermined vehicle speed by engaging the main brakes, engaging the auxiliary brakes, reducing the brake fluid pressure of the main brakes to a first pressure value, and reducing the brake fluid pressure of the main brakes to a second pressure value,
    wherein, when the auxiliary brakes perform a braking operation of the auxiliary brakes while the brake fluid pressure is being supplied to the main brakes to stop the vehicle, said control unit reduces the brake fluid pressure according to a first rate to a predetermined fluid pressure value and then reduces the brake fluid pressure according to a second rate before the main brakes is released, wherein the first rate is greater than the second rate,
    wherein, when a signal from the auxiliary brakes indicates that that the auxiliary brakes performs the braking operation of the auxiliary brakes, said control unit then automatically performs a reduction of the brake fluid pressure and then automatically releases the main brakes,
    wherein said control unit is configured to control the brake fluid pressure of the main brakes while the auxiliary brakes are working, and
    wherein said reducing the brake fluid pressure according to the first rate of the brake fluid pressure and said reducing the brake fluid pressure according to the second rate of the brake fluid pressure are synchronized with the braking operation of the auxiliary brakes.

7. A method of stopping a vehicle in an adaptive cruise control setting, said vehicle comprising a main brake controller configured to control a brake fluid pressure supplied to main brakes provided to four wheels of the vehicle according to a traveling condition of a preceding vehicle so as to automatically stop the vehicle, as a stop condition, using a braking operation of the main brakes, and to maintain the stop condition, and an auxiliary brake controller configured to control parking auxiliary brakes provided to right and left front wheels or right and left rear wheels of the vehicle to perform a braking operation of the parking auxiliary brakes so as to maintain the stop condition of the vehicle, said method comprising:

automatically stopping the vehicle based on the travelling condition of the vehicle by the main brake controller operation to the four wheels of the vehicle;

engaging the auxiliary brake controller to two wheels of the four wheels of the vehicle after said automatically stopping the vehicle;

reducing a main brake pressure to the four wheels to a first pressure value after the auxiliary brake controller engage the two wheels; and reducing the main brake pressure to a second pressure value, wherein, when the auxiliary brakes perform the braking operation of the auxiliary brakes while the brake fluid pressure is being supplied to the main brakes to stop the vehicle, the main brake controller reduces the brake fluid pressure according to a first rate to a predetermined fluid pressure value and then reduces the brake fluid pressure according to a second rate before the main brakes are released, wherein the first rate is greater than the second rate, wherein, when a signal from the auxiliary brakes indicates that that the auxiliary brakes perform the braking operation of the auxiliary brakes, the main brake controller then automatically performs a reduction of the brake fluid pressure and then automatically releases the main brakes, wherein the main brake controller is configured to control the brake fluid pressure of the main brakes while the auxiliary brakes are working, and wherein said reducing the brake fluid pressure according to the first rate of the brake fluid pressure and said reducing the brake fluid pressure according to the second rate of the brake fluid pressure are synchronized with the braking operation of the parking auxiliary brakes.

\* \* \* \* \*